(12) United States Patent
Longfield et al.

(10) Patent No.: US 8,220,533 B2
(45) Date of Patent: Jul. 17, 2012

(54) DOWNHOLE PIEZOELECTRIC DEVICES

(75) Inventors: Colin Longfield, Sugar Land, TX (US);
David Wei Wang, Sugar Land, TX (US);
Gary L. Rytlewski, League City, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 252 days.

(21) Appl. No.: 12/505,340

(22) Filed: Jul. 17, 2009

(65) Prior Publication Data

US 2010/0012313 A1    Jan. 21, 2010

Related U.S. Application Data

(60) Provisional application No. 61/081,465, filed on Jul. 17, 2008.

(51) Int. Cl.
*E21B 34/08* (2006.01)
(52) U.S. Cl. .................. 166/66.6; 251/129.06
(58) Field of Classification Search .......... 166/66.6, 166/66.7; 251/129.06
See application file for complete search history.

(56) References Cited

U.S. PATENT DOCUMENTS

| | | | |
|---|---|---|---|
| 5,354,032 A * | 10/1994 | Sims et al. ............... | 251/129.06 |
| 5,779,149 A | 7/1998 | Hayes, Jr. | |
| 6,012,518 A | 1/2000 | Pringle et al. | |
| 6,017,016 A * | 1/2000 | Jackson ................... | 251/129.06 |
| 6,213,203 B1 | 4/2001 | Edwards et al. | |
| 6,244,351 B1 | 6/2001 | Patel et al. | |
| 6,253,736 B1 | 7/2001 | Crofts et al. | |
| 6,321,845 B1 | 11/2001 | Deaton | |
| 6,354,374 B1 | 3/2002 | Edwards et al. | |
| 6,359,569 B2 | 3/2002 | Beck et al. | |
| 6,433,991 B1 * | 8/2002 | Deaton et al. ................ | 361/191 |
| 6,478,090 B2 * | 11/2002 | Deaton ......................... | 166/363 |
| 6,655,654 B1 | 12/2003 | Cotton, III et al. | |
| 7,111,675 B2 | 9/2006 | Zisk, Jr. | |
| 7,198,250 B2 * | 4/2007 | East ........................... | 251/129.06 |
| 7,322,376 B2 * | 1/2008 | Frisch ........................ | 137/625.65 |
| 7,331,398 B2 | 2/2008 | Dwivedi et al. | |
| 7,337,850 B2 | 3/2008 | Contant | |
| 7,373,972 B2 * | 5/2008 | Ocalan ....................... | 166/66.7 |
| 7,464,761 B2 | 12/2008 | Hosatte et al. | |
| 7,854,267 B2 * | 12/2010 | Smith et al. .................. | 166/381 |
| 2001/0035509 A1 * | 11/2001 | Chase et al. ............. | 251/129.01 |
| 2005/0173564 A1 | 8/2005 | Cooke | |
| 2009/0101329 A1 * | 4/2009 | Clem et al. .................. | 166/66.6 |
| 2009/0194289 A1 * | 8/2009 | Clem ........................... | 166/320 |

* cited by examiner

*Primary Examiner* — Hoang Dang
(74) *Attorney, Agent, or Firm* — Chadwick A. Sullivan; Rodney Warfford

(57) ABSTRACT

According to one or more aspects of the present disclosure, a piezoelectric pump may include a hydraulic fluid path between a low pressure source and a high pressure tool port; a fluid disposed in the hydraulic fluid path; a piston in communication with the fluid; and a piezoelectric material connected to the piston to pump the fluid through the high pressure tool port.

7 Claims, 4 Drawing Sheets

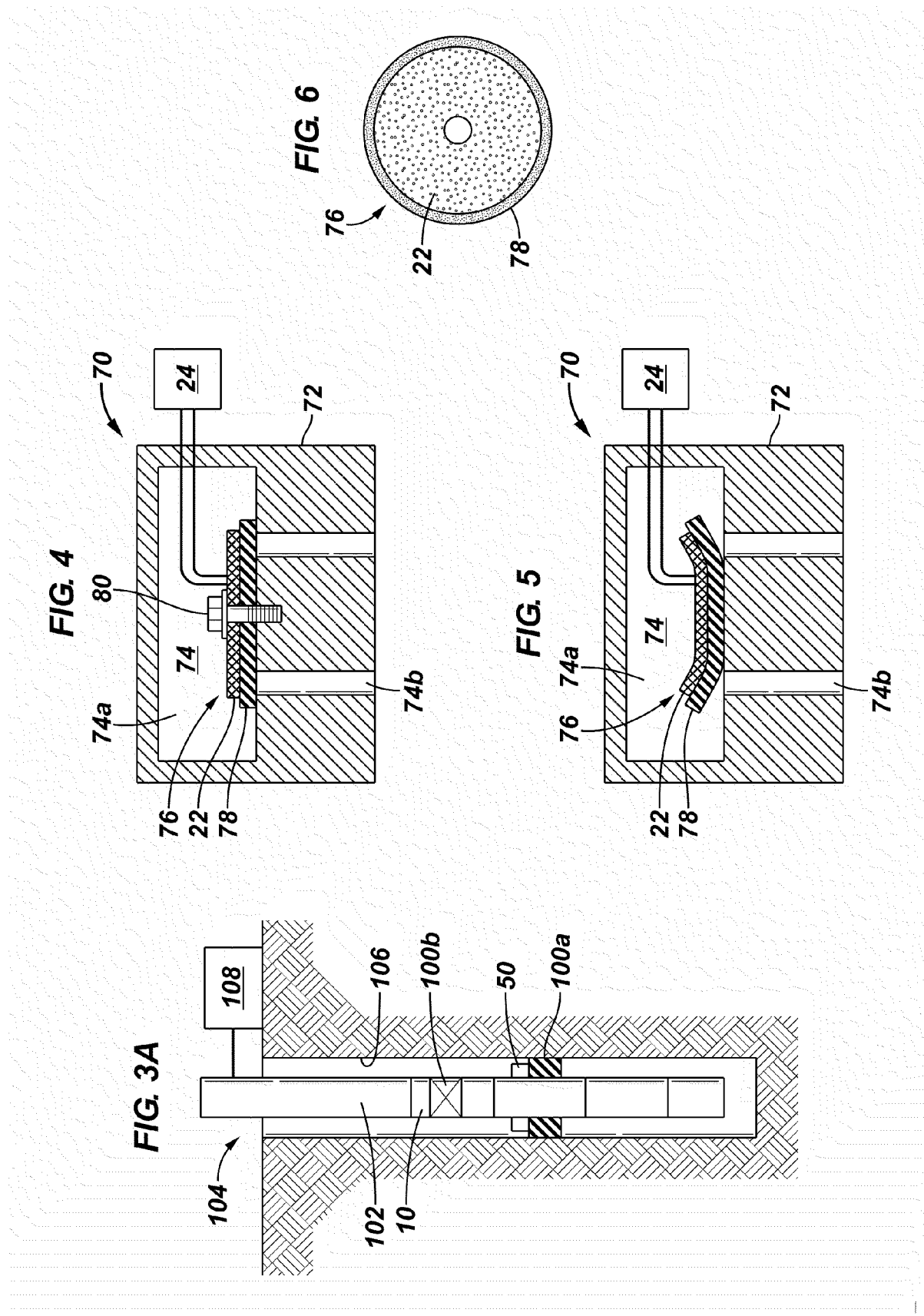

DOWNHOLE PIEZOELECTRIC DEVICES

RELATED APPLICATIONS

This application claims the benefit of U.S. Provisional Patent Application No. 61/081,465 filed Jul. 17, 2008.

BACKGROUND

As more and more intelligent downhole equipment are used in the harsh oil field environment such as high temperature and high pressure conditions, establishing an efficient way to activate a downhole device becomes more and more valuable. An electro-mechanical actuator, such as a solenoid, needs to be activated with significant amount of electrical power. Moreover, if the electro-mechanical actuator needs to hold a position, a significant amount of power is used to maintain the electric field.

In downhole equipment, differential pressure may be needed to move pistons that operate valves, set packers and plugs for example. This differential pressure can be obtained by an atmospheric chamber and controlling the annulus hydrostatic pressure to be ported into the atmospheric chamber. When hydrostatic pressure becomes extreme (e.g., above 20,000 psi), the atmospheric chamber creates extreme pressure differentials across seals and pressure containing materials. A method of reducing and controlling the differential pressure is to develop differential pressure via an electrical pump. Again, a significant amount of power is necessary to keep the pump operating. However, the downhole electrical power capacity is limited in the harsh environment.

SUMMARY

A piezoelectric device according to one or more aspects of the present disclosure may include a valve disposed between a high pressure source and a low pressure source; a member in connection with the valve; and a piezoelectric material connected to the member, wherein the piezoelectric material actuates the valve when energized.

The device may further include a passage in pressure communication between the low pressure source and the piezoelectric material. The high pressure source and/or the low pressure source may include an accumulator. The member may include a piston. The member may comprise a bellow. The device may include a downhole tool in operational connection to the high pressure source and the low pressure source.

According to one or more aspects of the present disclosure, a piezoelectric pump may include a hydraulic fluid path between a low pressure source and a high pressure tool port; a fluid disposed in the hydraulic fluid path; a piston in communication with the fluid; and a piezoelectric material connected to the piston to pump the fluid through the high pressure tool port. The pump may include a passage in pressure communication between the piezoelectric material and the lower pressure source.

A check valve may be positioned in the hydraulic fluid path. The check valve may include a piezoelectric valve member. The piezoelectric valve member may comprise a piezoelectric material connected to a resilient member.

According to one or more aspects of the present disclosure the piezoelectric pump may comprise a first check valve connected in the fluid path between the low pressure source and the piston, the first check valve permitting one-way fluid flow from the low pressure source; and a second check valve connected in the fluid path between the high pressure tool port and the piston, the second check valve permitting one-way fluid flow toward the high pressure tool port. At least one of the first check valve and the second check valve may include a piezoelectric valve member.

A piezoelectric valve according to one or more aspects of the present disclosure may include a body having a flow path formed therethrough; and a valve member positioned to selectively allow flow through the flow path, wherein the valve member comprises a piezoelectric material connected to a resilient member.

The foregoing has outlined some of the features and technical advantages of various embodiments in order that the detailed description that follows may be better understood. Additional features and advantages of various embodiments will be described hereinafter which form the subject of the present claims.

BRIEF DESCRIPTION OF THE DRAWINGS

The present disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

FIG. 3A is a schematic view of one or more piezoelectric devices according to one or more aspects of the present disclosure disposed in a well.

FIGS. 4 and 5 are schematic views of a piezoelectric valve according to one or more aspects of the present disclosure.

FIG. 6 is a schematic view of a piezoelectric valve member according to one or more aspects of the present disclosure.

DETAILED DESCRIPTION

In the following description, numerous details are set forth to provide an understanding of present embodiments of features. However, it will be understood by those skilled in the art that many embodiments may be practiced without many of these details and that numerous variations or modifications from the described embodiments are possible.

The present disclosure relates to piezoelectric devices, apparatus, systems and methods for use in wellbore environments. According to some aspects of the present disclosure the piezoelectric devices are adapted for use in harsh wellbore environments. According to one or more aspects the piezoelectric devices may be utilized in combination with various downhole wellbore tools. Examples of some systems and devices in which piezoelectric devices of the present disclosure according to one or more aspects of the present disclosure may be utilized include U.S. Pat. Nos. 7,464,761; 7,337,850; 7,331,398; 6,354,374; 6,244,351; 6,213,203; and 6,012,518 all of which are incorporated herein by reference. The foregoing incorporated documents provide examples of a limited number of examples in which one or more of the piezoelectric devices of the present disclosure may be utilized.

Figure 1:
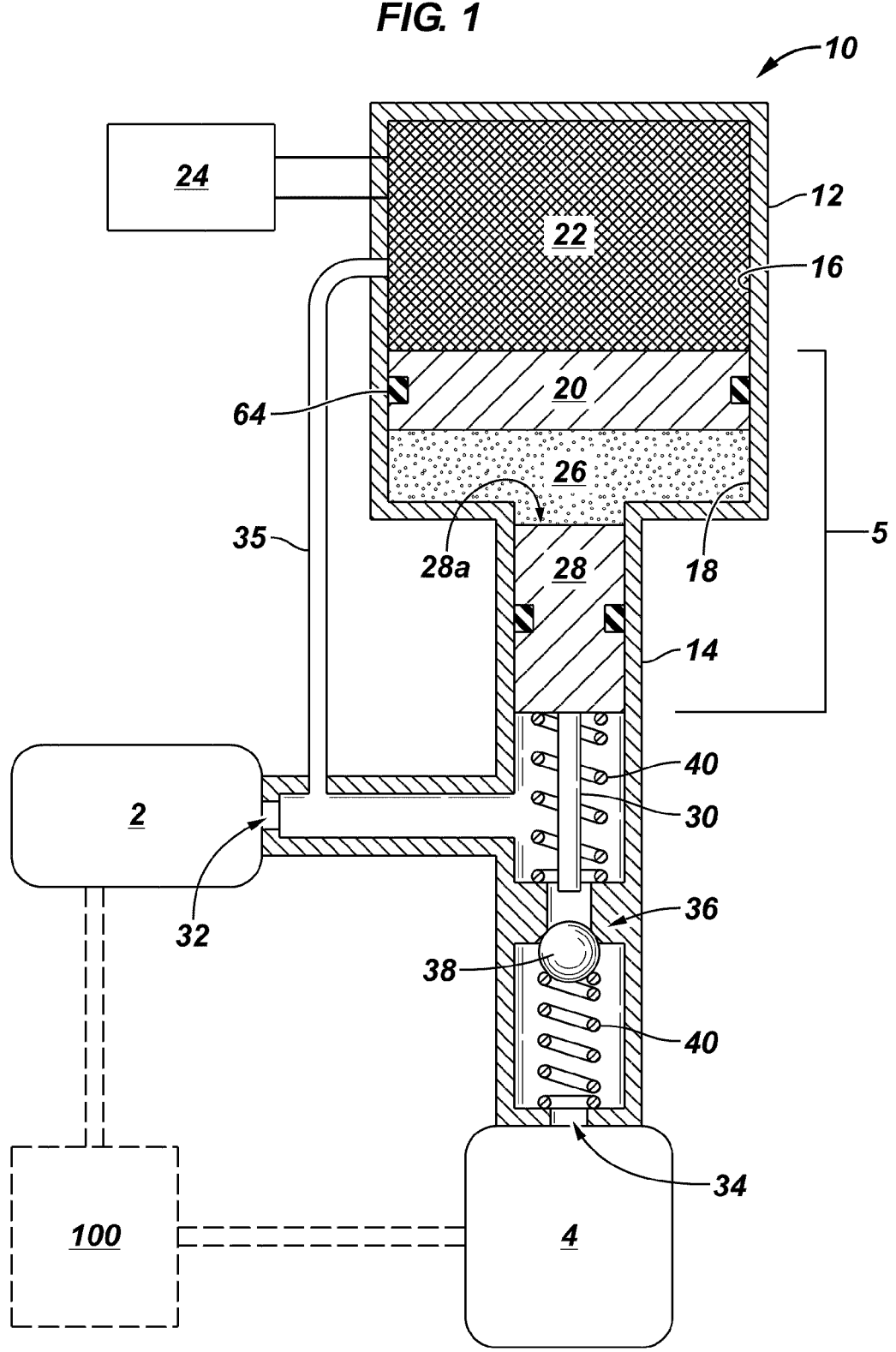
FIG. 1 is a schematic view of a piezoelectric actuator according to one or more aspects of the present disclosure.

FIG. 1 is a schematic diagram of a downhole piezoelectric actuator according to one or more aspects of the present disclosure generally denoted by the numeral 10. Actuator 10 is an electro-mechanical actuator for operating a downhole tool such as, and without limitation to, downhole valves, formation sample tools, packers etc.

Figure 2:
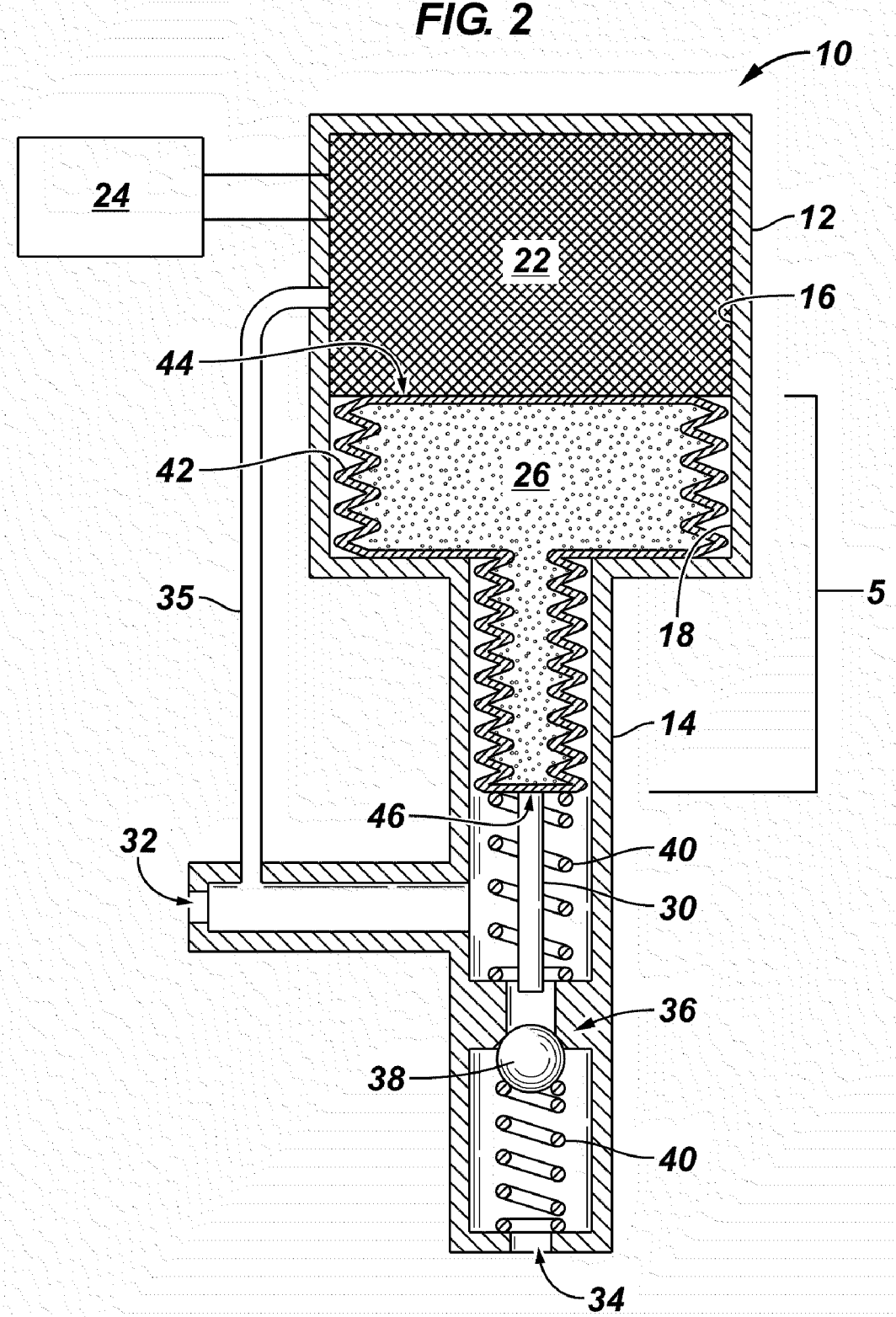
FIG. 2 is a schematic view of a piezoelectric actuator according to one or more aspects of the present disclosure.

In the depicted embodiments of FIGS. 1 and 2, actuator 10 includes a stroke amplifier 5 which may be excluded in some embodiments. Actuator 10, as depicted, comprises a first cylinder 12 and a second cylinder 14. First cylinder 12 includes a first chamber 16 and a second chamber 18 separated by a first piston 20. Piezoelectric material 22 is disposed in the first chamber 16. Piezoelectric material 22 is in connection with an electrical source 24. Piezoelectric material 22 responds to the application of voltage from source 24 in a known fashion to provide a force as described herein. Electric source 24 may be positioned in the wellbore or remote from the device 10, such as at the surface.

A fluid 26 (e.g., gas or liquid) is disposed in chamber 18 in the depicted embodiment. In the embodiment of FIG. 1, fluid 26 is hydraulic oil. Actuator 10 of FIG. 1 includes a second piston 28, which is disposed in second cylinder 14. Second piston 28 has a face 28a communicating with second cylinder 14. The surface area (e.g., diameter) of face 28a is less than that of first piston 20. Amplifier 5 comprises first piston 10 and second piston 28 in the depicted actuator of FIG. 1. In the depicted embodiment, a member 30 (e.g., needle) extends from second piston 28 opposite of face 28a and second chamber 18.

Second cylinder 14 is in communication between a low pressure port 32 and a high pressure port 34. In the embodiments of FIGS. 1 and 2, low pressure port is in communication with a low pressure source 2 and high pressure port 34 is in communication with a high pressure source 4. Low pressure source 2 and high pressure source 4 may be provided by accumulators 2, 4 respectively as depicted in FIG. 1. In some embodiments, the low and/or high pressure may be provided from the surface of the well and/or by the formation or wellbore. Pressure sources 2 and 4 are separated by a valve 36 having a valve member 38 in FIGS. 1 and 2. A passage 35 (e.g., conduit, line, port, etc.) provides pressure communication between first chamber 16 of first cylinder 12 and low pressure port 32 to balance the pressure across piezoelectric material 22.

Member 30 is oriented to actuate valve 36 by moving valve member 38. In the schematic illustration of FIG. 1, member 30 is illustrated as directly contacting a valve member 38 (e.g., ball, flapper, gate, etc.), however, member 30 may be connected to valve member 38 by various means and members.

An example of operation of apparatus 10 is now described with reference to FIG. 1. Before piezoelectric material 22 is energized, valve member 38 is seated via a biasing mechanism 40 (e.g., spring) isolating low pressure port 32 and high pressure port 34. Second chamber 18, containing fluid 26, is at substantially the same pressure as low pressure port 32. Communication passage 35 allows for the pressure to balance across piezoelectric material 22. Seals 64 may be provide a fluid barrier between fluid 26 and piezoelectric material 22.

Piezoelectric material 22 responds to the application of an electric voltage from source 24 to extend. Upon energizing, piezoelectric material 22 acts on first piston 20 urging it against fluid 26 in second chamber 18 which is urged against face 28a of second piston 28. The areas of first piston 20 and the smaller second piston 28 may be selected so that the stroke length induced by piezoelectric material 22 will be amplified as needed for the particular application. The smaller piston 28 moves member 30 which acts on valve member 38 to open valve 36. High pressure fluid flows via high pressure port 34 through valve 36 to low pressure port 32 when valve 36 is open. The pressure differential occurring across device 10 (e.g., accumulators 2 and 4) may be utilized to operate downhole tool 100 as is known in the art. Downhole tool 100 may include, without limitation, valves, pumps, packers, sampling tools, and electric and hydraulic relays.

As previously noted, apparatus 10 may not include a stroke amplifier or may include a stroke amplifier other than one depicted. Other amplifiers, including without limitation levers and hinged connections may be utilized. FIG. 2 illustrates an example of an alternative stroke amplifier. In the example of FIG. 2, amplifier 5 includes a bellow 42 that replaces first piston 20, second piston 28 and fluid 26. Bellow 42 includes a first face 44 in communication with piezoelectric material 22 and/or first chamber 16 and a second face 46 oriented toward valve 36. First face 44 has a larger diameter than second face 46.

Figure 3:
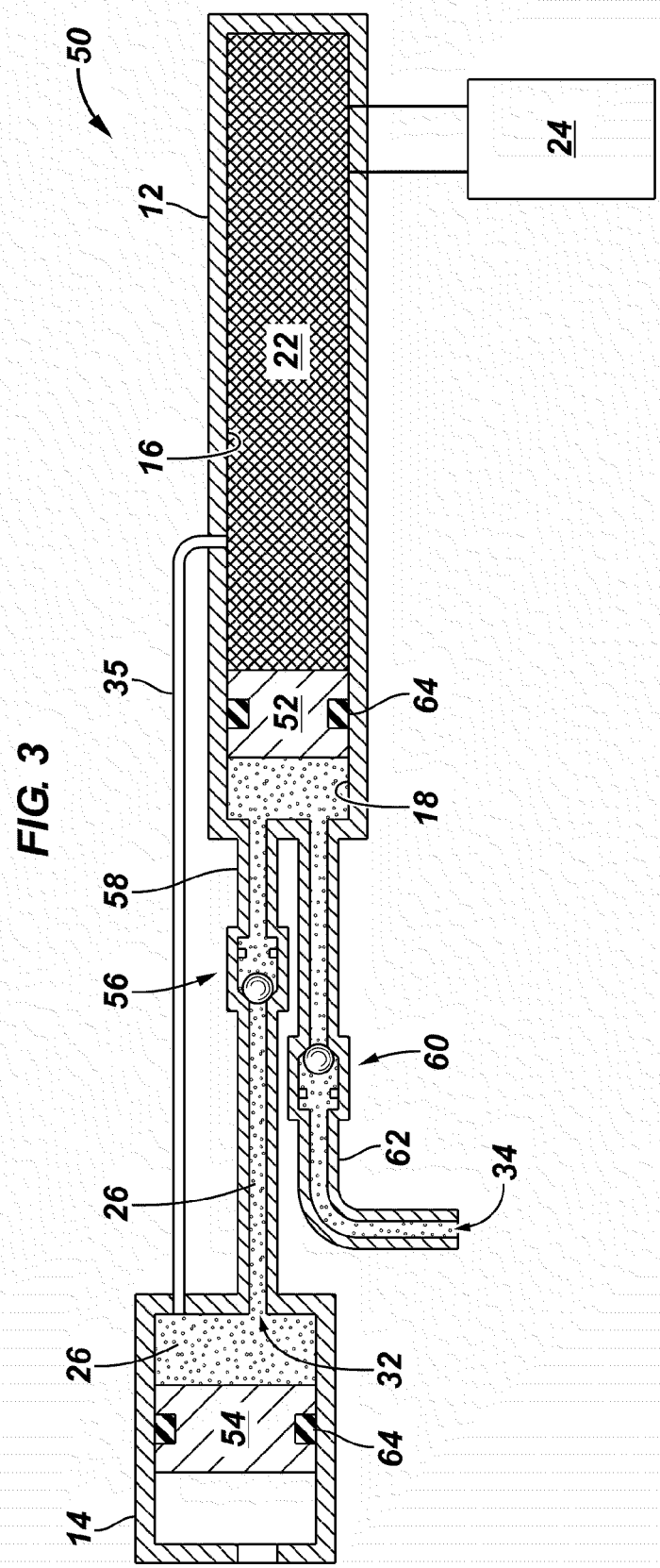
FIG. 3 is a schematic view of a piezoelectric pump according to one or more aspects of the present disclosure.

In another aspect of the disclosure piezoelectric material 22 is utilized as a source of hydraulic pressure for operating a downhole tool, such as and not limited to, packers and valve. FIG. 3 is a schematic of a piezoelectric pump according to one or more aspects of the present disclosure generally denoted by the numeral 50. Hydraulic pumps are often required and or utilized in wellbores as a source of hydraulic pressure.

Pump 50 may comprise piezoelectric material 22 disposed in a piezoelectric chamber 16 (e.g., first chamber) of a first cylinder 12 which may also be referred to as a housing. Piezoelectric material 22 is separated (e.g., isolated) from a fluid 26 (e.g., hydraulic fluid) by piston member 52. Fluid 26 is disposed in a fluid path depicted in FIG. 3 as cylinder 14, flow path 58, chamber 18 and flow path 62. The fluid path is provided from low pressure port at cylinder 14 to high pressure tool port 34. The low pressure source depicted in FIG. 3 includes cylinder 14 containing fluid 26 and the source of pressure 2 (e.g., wellbore pressure, formation pressure) acting on piston 64 against fluid 26. Low pressure port 32 may also be in communication with a pressure source such as an accumulator and/or hydraulic line. A pressure communication passage 35 may be connected between low pressure port 32 and piezoelectric chamber 16 to balance the pressure across piezoelectric material 22.

High pressure port 34 may be in fluid communication with a downhole tool, for example as depicted in FIG. 3A. Second cylinder 14 may comprise an accumulator containing fluid 26 (e.g., hydraulic fluid). A first check valve 56 may be positioned in the flow path portion 58 between pistons 52 and 54. A second check valve 60 is positioned in the fluid flow path portion 62 between the high pressure port 34 of the downhole tool (e.g., valve, packer etc.) and second chamber 18.

An example of operation is now described with reference to pump 50 depicted in FIG. 3. When piezoelectric material 22 is not energized, check valve 56 is opened by the source of pressure 2 (e.g., reservoir pressure) acting on piston 54 and fluid 26. Second check valve 60 is closed when piezoelectric material 22 is not energized. Pressure across piezoelectric material 22 may be balanced by communication provided between low pressure fluid (e.g., wellbore pressure, reservoir pressure) and piezoelectric chamber 16 via communication passage 35. Seals 64 (e.g., o-rings, etc.) may be utilized to prevent the piezoelectric material 22 from contacting fluid 26 across piston member 52.

Applying electric voltage to piezoelectric material 22 via electric source 24 causes it to extend and act on first piston 52 pumping fluid 26 through flow path portion 62 of the fluid path, opening check valve 60, and out of tool port 34. Check valve 56 is closed in this step. By energizing and de-energizing piezoelectric material 22, the tool pressure can be pumped higher than the reservoir pressure.

FIG. 3A schematically illustrates piezoelectric pump 50 in connection with a downhole tool 100a according to one or more aspects of the present disclosure. In this example, downhole tool 100a is an inflatable packer disposed on a tubular string 102. String 102 is disposed in a well 104. In the depicted example, piezoelectric pump 50 may be utilized to apply the necessary hydraulic pressure to activate packer 100a to engage the wall 106 (e.g., casing, formation) of well 104. A controller 108 is depicted at the surface for communicating with the one or more downhole tools 100 and piezoelectric devices.

Well 104 includes a piezoelectric actuator 10 in connection with a downhole tool 100b. In the depicted example, downhole tool 100b is a valve such as, and without limitation, a downhole safety valve or formation isolation valve. Downhole tool 100b may be operated in response to the pressure differential provided by operation of piezoelectric actuator 10. Although not specifically shown, a piezoelectric actuator 10 and a piezoelectric pump 50 may be in connection with a single downhole tool.

As described with reference to FIG. 3, check valves 56 and 60 may be flow control devices such as one-way valves. In some embodiments, check valves 56 and/or 60 may comprise a contemporary type check valve. In some embodiments, check valves 56 and/or 60 may comprise a piezoelectric valve such as illustrated in FIGS. 4 and 5 or may include a valve member 76 such as illustrated in FIG. 6.

FIGS. 4 and 5 are schematic illustrations of a piezoelectric valve according to one or more aspects of the present disclosure generally denoted by the numeral 70. Valve 70 is shown closed in FIG. 4 and open in FIG. 5. Valve 70 comprises a housing 72 having a fluid flow path 74 formed therethrough. Flow path 74 is selectively blocked by a piezoelectric valve member 76. Piezoelectric valve member 76 comprises a piezoelectric material 22 connected to a resilient member 78, such as a rubber, elastomer, etc. in a layered fashion. Piezoelectric member 22 is in connection with an electric source 24.

Flow path 74 depicted in FIGS. 4 and 5 are divided into different portions 74a and 74b separated by valve member 76. Portion 74b may comprise multiple conduits and/or a circular conduit having a filled center such as depicted in FIGS. 4 and 5. The flow path may be formed in various manners to provide the desired flow capacity, flow characteristics etc. Valve member 76 may be connected in various manners. For example, in FIG. 4, valve member 76 is illustrated has being connected via a bolt 80 to housing 74.

Referring to FIGS. 4 and 5, a method of operating valve 70 according to one or more aspects of the disclosure is described. Valve 70 may be positioned in a fluid flow path, for example in place of one or more of check valves 56 and 60 of FIG. 3, as an independent valve, or as a valve incorporated in another downhole tool. When valve member 76, in particular piezoelectric material 22, is not electrically energized it is relaxed and in the closed position shown in FIG. 4. To open valve 70 an electric voltage is applied, for example via electric source 24, to piezoelectric material 22. When piezoelectric material 22 is energized it acts on resilient material 78 causing it to warp and open the fluid path between sections 74a and 74b. By controlling the electric voltage applied, the movement of valve member 76 may be controlled thus controlling the fluid flow area through flow path 74.

FIG. 6 is a schematic illustration of a valve member 76 according to one or more aspects of the present disclosure. In the depicted embodiment, piezoelectric material 22 does not extend across the diameter, or circumference of resilient member 78.

Many hydraulic circuits require a pilot operated valve between the solenoid and main tool valves to achieve acceptable opening or closing speeds. The flow rate through most high pressure solenoids valves are small and are designed smaller as pressure differentials increase. The solenoids develop a limited force so the seat areas must be small for this force to overcome the differential pressure. The piezoelectric valve 70 and/or valve member 76 may be utilized to replace contemporary solenoid valves and the like.

Although specific embodiments have been disclosed herein in some detail, this has been done solely for the purposes of describing various features and aspects of the invention, and is not intended to be limiting with respect to the scope of any present of future related claims. It is contemplated that various substitutions, alterations, and/or modifications, including but not limited to those implementation variations which may have been suggested herein, may be made to the disclosed embodiments without departing from the spirit and scope as defined by the appended claims which follow.

What is claimed is:

1. A piezoelectric device for use in a wellbore comprising:
    a valve disposed between a high pressure source and a low pressure source;
    a member in connection with the valve;
    a piezoelectric material connected to the member, wherein the piezoelectric material actuates the valve when energized; and
    a passage in pressure communication between the low pressure source and the piezoelectric material.

2. The device of claim 1, wherein the member comprises a piston.

3. The device of claim 1, wherein the member comprises a bellow.

4. The device of claim 1, comprising a downhole tool in operational connection to the high pressure source and the low pressure source.

5. A piezoelectric device for use in a wellbore comprising:
    a valve disposed between a high pressure source and a low pressure source;
    a member in connection with the valve; and
    a piezoelectric material connected to the member, wherein the piezoelectric material actuates the valve when energized,
wherein the high pressure source comprises an accumulator.

6. A piezoelectric device for use in a wellbore comprising:
    a valve disposed between a high pressure source and a low pressure source;
    a member in connection with the valve; and
    a piezoelectric material connected to the member, wherein the piezoelectric material actuates the valve when energized,
wherein the low pressure source comprises an accumulator.

7. The device of claim 6, further comprising a passage in pressure communication between the low pressure source and the piezoelectric material.

* * * * *